(12) United States Patent
Holenarsipur

(10) Patent No.: US 8,507,863 B2
(45) Date of Patent: Aug. 13, 2013

(54) REFLECTIVE PROXIMITY SENSOR WITH IMPROVED SMUDGE RESISTANCE AND REDUCED CROSSTALK

(75) Inventor: Prashanth Holenarsipur, Fremont, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 13/350,651

(22) Filed: Jan. 13, 2012

(65) Prior Publication Data

US 2013/0181131 A1  Jul. 18, 2013

(51) Int. Cl.
*G01J 5/00* (2006.01)
(52) U.S. Cl.
USPC ........................................... 250/338.1
(58) Field of Classification Search
USPC ................................. 250/338.1–338.5
See application file for complete search history.

(56) References Cited

U.S. PATENT DOCUMENTS

| | | | |
|---|---|---|---|
| 5,103,085 A | | 4/1992 | Zimmerman |
| 7,663,106 B2 * | | 2/2010 | Ushimi et al. ............ 250/338.1 |
| 2011/0121182 A1 | | 5/2011 | Wong et al. |
| 2011/0204233 A1 | | 8/2011 | Costello et al. |
| 2012/0129579 A1 * | | 5/2012 | Tam ........................ 455/575.1 |

FOREIGN PATENT DOCUMENTS

WO 2011052788 A1 5/2011

OTHER PUBLICATIONS

U.S. Appl. No. 12/950,187, filed Nov. 19, 2010, entitled "Proximity Sensor Arrangement in a Mobile Device".
U.S. Appl. No. 12/950,461, filed Nov. 19, 2010, entitled "Proximity Sensor Arrangement Having a Cold Mirror in a Mobile Device".
U.S. Appl. No. 13/111,910, filed May 19, 2011, entitled "Proximity and Ambient Light Sensor with Improved Smudge Rejection".

* cited by examiner

*Primary Examiner* — Kiho Kim
(74) *Attorney, Agent, or Firm* — Blakely, Sokoloff, Taylor & Zafman LLP

(57) ABSTRACT

An electronic device includes a protective layer above a proximity sensor having a radiation emitter and a radiation detector. A groove, which may be wedge shaped, is formed in the bottom surface of the protective layer. A radiation barrier, which may be reflective or absorptive material, is placed in the groove in the bottom surface of the protective layer. A light blocking coating may be applied to the bottom surface and the groove of the protective layer to prevent the passage of visible radiation and permit the passage of infrared radiation. A radiation shield may be positioned between the emitter and the detector directly below the radiation barrier. Alignment features may be formed on the mating surfaces of the radiation barrier and radiation shield to align the protective layer with respect to the radiation shield and proximity sensor.

24 Claims, 3 Drawing Sheets ically such proximity sensors are designed to detect an
REFLECTIVE PROXIMITY SENSOR WITH IMPROVED SMUDGE RESISTANCE AND REDUCED CROSSTALK

BACKGROUND

1. Field

Embodiments of the invention relate to the field of proximity sensors; and more specifically, to proximity sensor arrangements having a protective layer above the sensor to improve resistance to smudges on the protective layer and to reduce crosstalk between the emitter and detector due to the protective layer.

2. Background

Proximity sensors are used to sense hover events in a wide variety of devices including laptop computers, tablet computers, and smart phones. Hover events are no touch, close proximity positioning of parts of the user's body or other objects (e.g., a stylus held by the user), near or on an external surface of the device. It will be appreciated that "no touch" indicates that the sensor is not touched and that the external surface of the device may or may not be touched.

Typically such proximity sensors are designed to detect an external object that is located outside the near field detection capability of a touch sensor (e.g., those used in a typical touch screen display such as found in an iPhone™ device by Apple Inc.). In one instance, the proximity sensor includes an infrared emitter and a counterpart infrared detector that are controlled and sampled by proximity sensor circuitry integrated in the housing of the mobile device. Emitted infrared radiation may be scattered and/or directed toward the detector by the external object. Infrared radiation is detected and analyzed to infer that an external object is (or is not) close to the exterior surface. Because the detector receives emitted radiation that is reflected by the external object, such sensors may be referred to as reflective proximity sensors.

In the case of handheld mobile communications devices, the sensor may be located near an acoustic aperture for an earpiece speaker (receiver) of a mobile communications handset. This arrangement is used to determine when the handset is being held close to the user's ear, as opposed to away from the ear. When the proximity sensor indicates that the external object, in this case, the user's ear or head, is sufficiently close, then a predetermined action is taken, including, for example, turning off or disabling a touch screen display that is on the same external face of the housing as the acoustic aperture. This, of course, is designed to avoid unintended touch events caused by the user's cheek, while the handset is held close to the user's ear during a call.

The external surface of the device typically provides a protective layer above the proximity sensor and its associated electronics. The protective layer is made of materials that allow electromagnetic radiation of the wavelengths detected by the detector to pass through the protective layer. However, the protective layer itself will scatter and/or direct emitted infrared radiation toward the detector and interfere with detection of an external object. Smudges and dirt on the exterior surface can aggravate this interference.

It would be desirable to provide an exterior surface that provides a protective layer over a reflective proximity sensor in a way that reduces the effect of reflections and scattering from the protective layer and provides improved smudge resistance and reduced crosstalk between the emitter and the detector in the absence of an external object.

SUMMARY

An electronic device includes a protective layer above a proximity sensor having a radiation emitter and a radiation detector. A radiation shield is positioned between the emitter and the detector and extends to the bottom surface of the protective layer. A groove, which may be wedge shaped, is formed in the bottom surface of the protective layer directly above the top surface of the radiation shield. A radiation barrier, which may be reflective or absorptive material, is placed in the groove in the bottom surface of the protective layer. A light blocking coating may be applied to the bottom surface and the groove of the protective layer to prevent the passage of visible radiation and permit the passage of infrared radiation. Alignment features may be formed on the mating surfaces of the radiation barrier and radiation shield to align the protective layer with respect to the radiation shield and proximity sensor. A radiation absorber, which is a separate piece and of a separate material than the shield, may be positioned to provide a radiation seal between the top surface of the radiation shield and the bottom surface of the radiation barrier.

The structure of the radiation shield and the radiation barrier may help prevent stray radiation from the emitter that may have been internally reflected within the protective layer, from impinging on the detector. This internally reflected stray radiation (which is attenuated by the absorber) may be caused by original radiation from the emitter that has been internally reflected from oily build-up and residue, also referred to here as smudge, that has formed on the exterior surface of the protective layer due to normal use of the device. As a result, a more accurate proximity sensor may be obtained.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary. Other features and advantages of the present invention will be apparent from the accompanying drawings and from the detailed description that follows below.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well known circuits, structures, and techniques have not been shown in detail so as not to obscure the understanding of this description.

Figure 1:
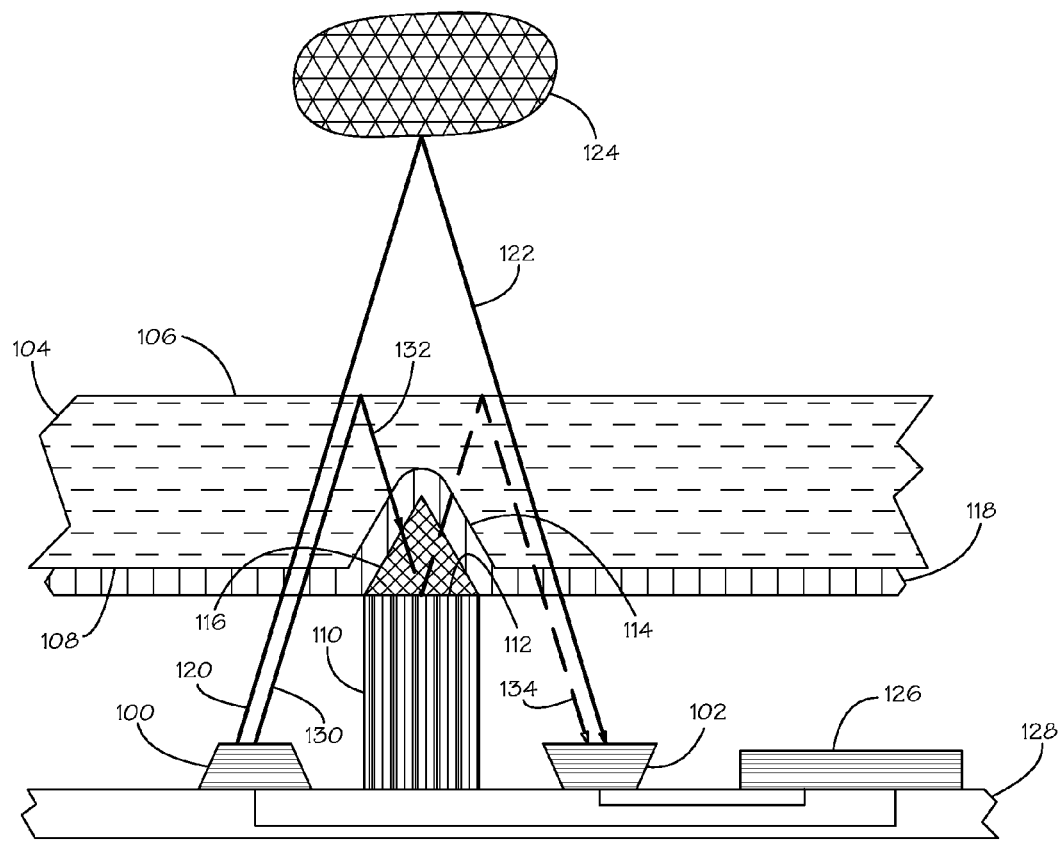
FIG. 1 is a cross-section view of a portion of an electronic device that embodies the invention.

FIG. 1 is a cross-section view of a portion of an electronic device that embodies the invention. The device includes a proximity sensor having a radiation emitter 100 and a radiation detector 102. The radiation emitter 100 and the radiation detector 102 may be mounted to a printed circuit board 128 or similar substrate and connected thereby to sensor circuitry 126 that controls the emitter and detector and determines the presence or absence of an external object based on the signals received.

A protective layer 104 is positioned above the proximity sensor. The protective layer has a top surface 106 and a bottom surface 108 adjacent the proximity sensor. The radiation emitter 100 and the radiation detector 102 are both directed toward the top surface 106 of the protective layer 104. A radiation shield 110 may be positioned between the emitter 100 and the detector 102 of the proximity sensor. A top surface 112 of the radiation shield 110 may be adjacent to the bottom surface 108 of the protective layer 104.

The proximity sensor includes the radiation emitter 100, which emits the radiation, such as infrared (IR) radiation or a laser light, and the counterpart detector 102, which is designed to detect impinging radiation. The emitter 100 and the detector 102 have their sensitive surfaces aimed at the protective layer 104, either directly or indirectly (e.g., through a prism or mirror arrangement). Both the emitter 100 and the detector 102 are controlled and/or sensed electrically by proximity sensor circuitry 126. This combination of the emitter, detector and proximity sensor circuitry may be a conventional, microelectronic infrared or laser proximity sensor unit, e.g. an IR or laser light emitting diode (LED)-based unit with a built-in light collector (lens), analog to digital conversion circuitry, and a digital communication interface to a processor (not shown). The detector may be part of a shared microelectronic device that can also be used to detect in other radiation bands, e.g. visible light. The data processor may be running proximity software that analyzes readings or samples from the proximity sensor circuitry 126, based on what has been emitted and what has been detected (as scattered or reflected radiation from the external object). The proximity software may then make a determination as to whether the external object is close, far, or in between.

A groove 114 formed in the bottom surface 108 of the protective layer 104 between the emitter 100 and the detector 102. A radiation barrier 116 is placed in the groove 114 in the bottom surface 108 of the protective layer 104. The radiation barrier 116 is located between the radiation emitter 100 and the radiation detector 102 such that the barrier blocks a substantial portion of the optical path for internal reflections in the protective layer 104. The dashed lines in the figure suggest an optical path for internal reflections in the protective layer 104 that is blocked by the radiation barrier 116. The groove 114 may be wedge shaped as in the embodiment illustrated. The groove may be other shapes such as semi-circular, rectangular, trapezoidal, or other shapes that provide on opening in the bottom surface of the protective layer to receive a radiation barrier. The radiation barrier 116 may be a reflective material or an absorptive material with respect to the electromagnetic radiation produced by the radiation emitter 100. In one embodiment, the radiation barrier 116 is an absorptive material that has the following characteristics in an infrared band 700 nm to 1,100 nm: transmittance less than five percent (5%), and reflectance less than ten percent (10%).

A light blocking coating 118 may be applied to the bottom surface 108 of the protective layer 104 to prevent the passage of visible radiation and permit the passage of infrared radiation when the radiation emitter 100 emits infrared radiation. The light blocking coating 118 may also be applied to the groove 114 between the protective layer 104 and the radiation barrier 116 in the groove. The light blocking coating 118 may provide an aesthetic appearance for the protective layer 104.

Exemplary rays 120, 130 are shown as being emitted by the radiation emitter 100 to illustrate the operation of the radiation barrier 116 to reduce cross talk between the radiation emitter and the radiation detector 102. The first ray 120 is shown striking an external object 124 and creating a reflected ray 122 that strikes the radiation detector 102.

The similarly directed second ray 130 is shown striking the top surface 106 of the protective layer 104 and being reflected by the process of internal reflection because of the higher index of refraction for the protective layer than the surrounding air. As can be seen, the reflected ray 132 from the top surface 106 strike the radiation barrier 116 in the groove 114 and are prevented from reaching the radiation detector 102. The dashed extension 134 of the second ray suggests how the ray would be reflected two more time and then strike the radiation detector 102.

It will be appreciated that the illustrated rays are simplified for purposes of explanation and that both the first 120 and the second 130 rays will have transmitted portions that strike the external object 124 and reflected portions that strike the radiation barrier 116. It will be further appreciated that there may be paths where radiation emitted by the radiation emitter 100 is reflected by the top surface 106 of the protective layer 104 and then strikes the radiation detector 102 despite the presence of the radiation barrier 116.

It will be further appreciated that the geometry illustrated is not to scale or proportion and that the elements of the device can be laid out in a variety of relationships which can affect the amount of cross talk reduction provided. In a typical device the distance between the radiation emitter 100 and the radiation detector 102 is about one to five millimeters. The protective layer 104 may be a glass layer. The desirable that the groove 114 and the radiation barrier 116 be a substantial portion of the thickness of the protective layer 104 and the strength of the grooved protective layer may determine the depth of the groove and the radiation barrier. It may be desirable to use a material for the radiation barrier, such as an epoxy, that also has properties that reinforce the protective layer along the groove.

Figure 2:
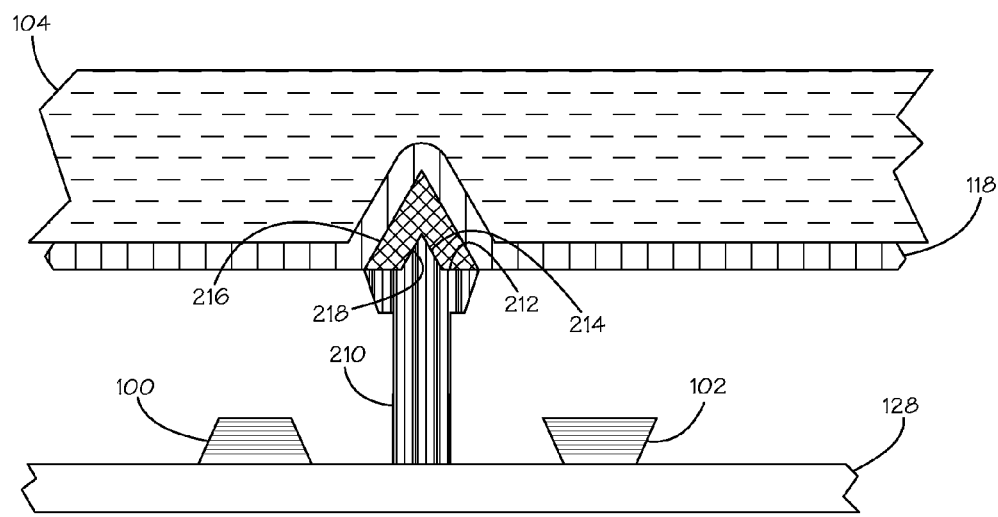
FIG. 2 is a cross-section view of a portion of a second electronic device that embodies the invention.

FIG. 2 is a cross-section view of a portion of a second electronic device that embodies the invention. In this embodiment the radiation barrier 216 has a top surface adjacent to the protective layer 104 and a bottom surface in which a first alignment feature 218 is formed. The radiation shield 210 has a second alignment feature 214 formed in the top surface 212. The second alignment feature 214 engages the first alignment feature 218 in the bottom surface of the radiation barrier 216 to align the protective layer 104 with respect to the radiation shield 210. In some embodiments the radiation barrier 210 is aligned with respect to the proximity sensor 100, 102 and the second alignment feature 214 engaging the first alignment feature 218 in the bottom surface of the radiation barrier 216 further aligns the protective layer 104 with respect to the proximity sensor.

Figure 3:
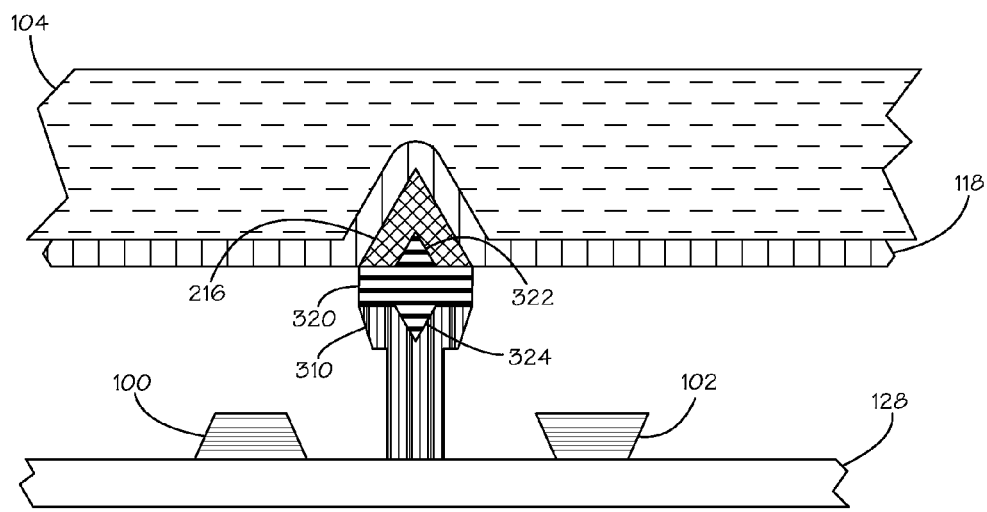
FIG. 3 is a cross-section view of a portion of a third electronic device that embodies the invention.

FIG. 3 is a cross-section view of a portion of a third electronic device that embodies the invention. In this embodiment the radiation shield has a two part construction, with a top portion 320 being formed of a different material than the lower portion 310. For example, the top portion 320 may be resilient while the lower portion 310 is rigid. The top portion 320 of the radiation shield may have greater infrared absorption characteristics than the lower portion 310. which may need to achieve other purposes (such as strength and low cost) that might sacrifice its radiation absorption characteristics. The top portion 320 of the radiation shield may include a lower alignment feature 324 that engages a corresponding alignment feature on the lower portion and an upper alignment feature 322 that engages a corresponding alignment feature on the radiation barrier 216. These alignment features 322, 324 align the protective layer 104 with respect to the radiation shield 310 and, in some embodiments, further with respect to the proximity sensor.

Figure 4:
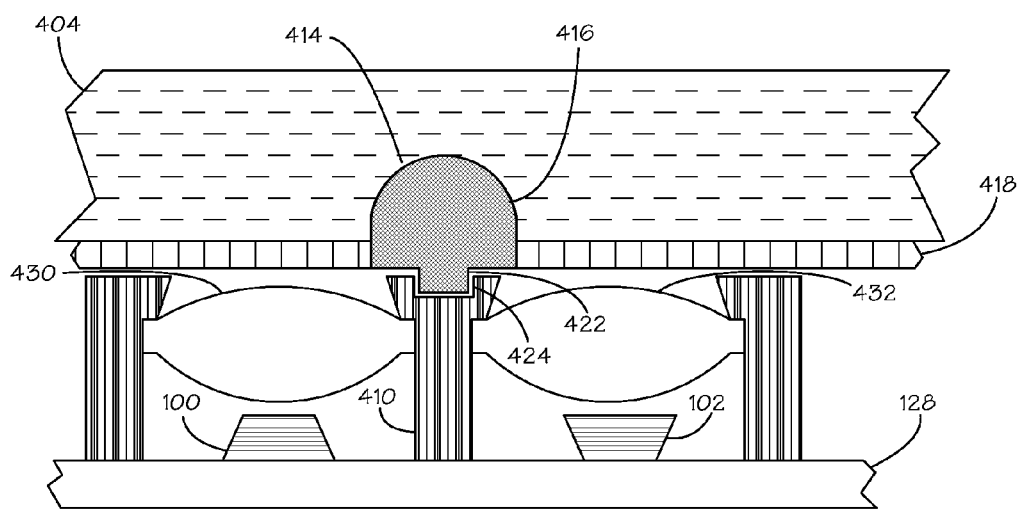
FIG. 4 is a cross-section view of a portion of a fourth electronic device that embodies the invention.

FIG. 4 is a cross-section view of a portion of a fourth electronic device that embodies the invention. In this embodiment the groove 414 in the protective layer 104 and the radiation barrier 416 that fills the groove have a rounded cross-section. The light blocking coating 418 is applied to the bottom surface of the protective layer 104 but is not applied to the groove 414 between the protective layer 404 and the radiation barrier 416 in the groove.

The radiation barrier 416 has a bottom surface in which a first alignment feature 422 is formed. The radiation shield 410 has a second alignment feature 424 formed in the top surface. The second alignment feature 424 engages the first alignment feature 422 to align the protective layer 404 with respect to the radiation shield 410 and, in some embodiments, further with respect to the proximity sensor. As suggested by the figure, the alignment features 422, 424 may have rectangular cross-sections and they may not be tightly engaged. Further, there may be some space between the top of the radiation shield 410 and the bottom of the protective layer 404 and the radiation barrier 416. The alignment features provide a labyrinth radiation seal and a tight mechanical seal is not required.

As shown in FIG. 4, some devices may include lenses 430, 432 between the protective layer 404 and one or both of the radiation emitter 100 and the radiation detector 102 to further improve the operational characteristics of the proximity sensor.

Figure 5:
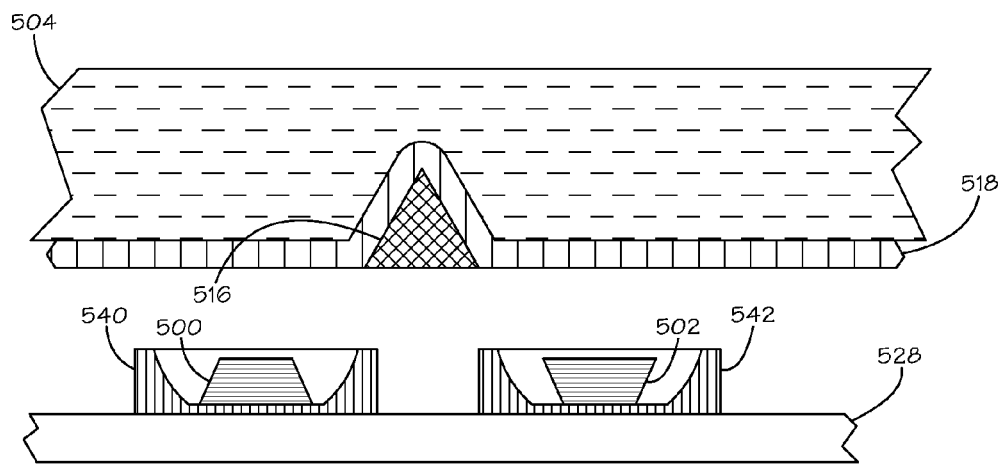
FIG. 5 is a cross-section view of a portion of a fifth electronic device that embodies the invention.

FIG. 5 is a cross-section view of a portion of a fifth electronic device that embodies the invention. In this embodiment no radiation shield is provided between a radiation barrier 516 that fills a groove in the protective layer 504 and a printed circuit board 528. A light blocking coating 518 is applied to the bottom surface of the protective layer 504 as in previously described embodiments. A radiation emitter 500 and a radiation detector 502 are mounted in reflective cups 540, 542 that collimate the radiation. The radiation barrier 516 is located between the radiation emitter 500 and the radiation detector 502 such that the barrier blocks a substantial portion of the optical path for internal reflections in the protective layer 504.

Figure 6:
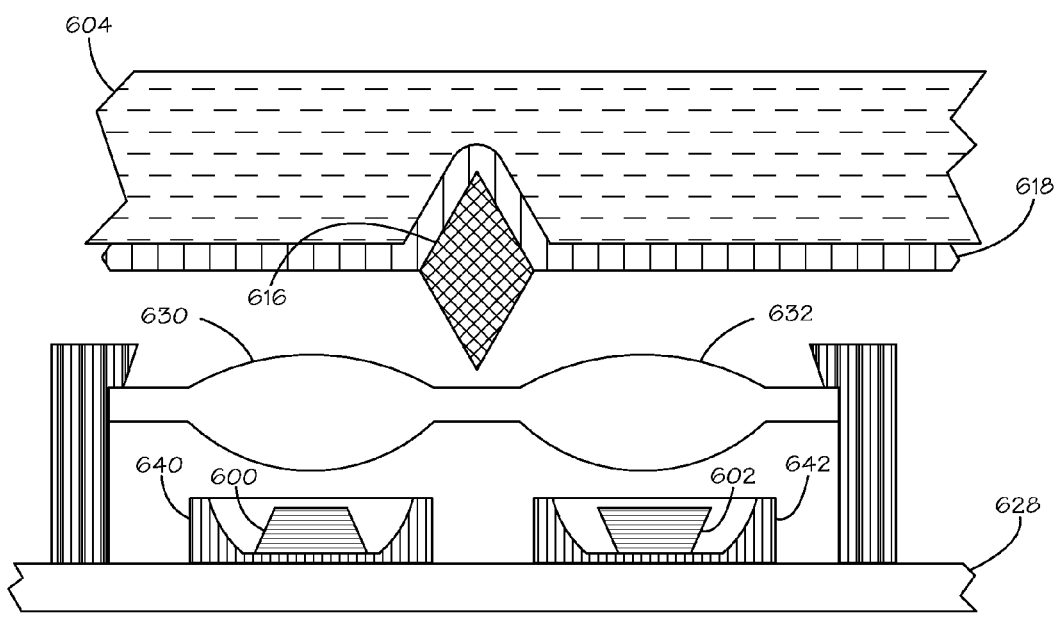
FIG. 6 is a cross-section view of a portion of a sixth electronic device that embodies the invention.

FIG. 6 is a cross-section view of a portion of a sixth electronic device that embodies the invention. In this embodiment a radiation barrier 616 that fills a groove in the protective layer 604 extends below the protective layer to provide a radiation shield that extends towards a printed circuit board 628. A light blocking coating 618 is applied to the bottom surface of the protective layer 604 as in previously described embodiments. A radiation emitter 600 and a radiation detector 602 are mounted in reflective cups 640, 642 that collimate the radiation. Lenses 630, 632 are provided between the radiation emitter 600 and the protective layer 604 and also between the radiation detector 602 and the protective layer to further collimate the radiation.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the drawings depict different layers being in contact with each other (e.g., in FIG. 1, layer 118 is in contact with the bottom of layer 104, and the radiation barrier 116 is in contact with the layer 118), this does not preclude an additional or intermediate layer between them so long as the purposes of the radiation barrier, including that of attenuating the stray internal reflections within the layer 104, are not thwarted. Optical arrangements for the emitter shown in one embodiment may be combined with optical arrangements shown for the detector in another embodiment. The radiation barrier shown in one embodiment may be combined with a radiation shield in another embodiment or used without a radiation shield. The arrangement of radiation barriers and radiation shields shown in one embodiment may be used with optical arrangements of the emitter and detector shown in other embodiments. The description is thus to be regarded as illustrative instead of limiting.

What is claimed is:

1. An electronic device comprising:
   a proximity sensor having a radiation emitter and a radiation detector;
   a protective layer positioned above the proximity sensor, the protective layer having a top surface and a bottom surface adjacent the proximity sensor;
   a groove formed in the bottom surface of the protective layer; and
   a radiation barrier in the groove in the bottom surface of the protective layer.

2. The device of claim 1 wherein the groove formed in the bottom surface of the protective layer is wedge shaped.

3. The device of claim 1 wherein the radiation barrier in the groove in the bottom surface of the protective layer is a reflective material.

4. The device of claim 1 wherein the radiation barrier in the groove in the bottom surface of the protective layer is an absorptive material.

5. The device of claim 1 wherein the radiation emitter and the radiation detector are both directed toward the top surface of the protective layer.

6. The device of claim 1 further comprising a light blocking coating applied to the bottom surface of the protective layer to prevent the passage of visible radiation and permit the passage of infrared radiation.

7. The device of claim 6 wherein the light blocking coating is further applied to the groove between the protective layer and the radiation barrier in the groove.

8. The device of claim 1 further comprising a radiation shield positioned between the emitter and the detector of the proximity sensor and directly below the radiation barrier, and having a top surface adjacent to the bottom surface of the protective layer.

9. The device of claim 8 wherein:
   the radiation barrier has a top surface adjacent to the protective layer and a bottom surface in which a first alignment feature is formed; and
   the radiation shield has a second alignment feature formed in the top surface, the second alignment feature engaging the first alignment feature in the bottom surface of the radiation barrier to align the protective layer with respect to the radiation shield.

10. The device of claim 8 wherein the radiation barrier is aligned with respect to the proximity sensor and the second alignment feature engaging the first alignment feature in the bottom surface of the radiation barrier further aligns the protective layer with respect to the proximity sensor.

11. A method of improving smudge resistance and reducing crosstalk in a reflective proximity sensor, the method comprising:
   positioning a protective layer above a proximity sensor having a radiation emitter and a radiation detector directed toward the protective layer, the protective layer having a top surface and a bottom surface adjacent the proximity sensor;
   forming a groove in the bottom surface of the protective layer; and
   placing a radiation barrier in the groove in the bottom surface of the protective layer.

12. The method of claim 11 wherein the radiation barrier is a reflective material.

13. The method of claim 11 wherein the radiation barrier is an absorptive material.

14. The method of claim 11 further comprising applying a light blocking coating to the bottom surface of the protective layer to prevent the passage of visible radiation and permit the passage of infrared radiation.

15. The method of claim 14 further comprising applying the light blocking coating to the groove between the protective layer and the radiation barrier in the groove.

16. The method of claim 11 further comprising positioning a radiation shield between the emitter and the detector of the proximity sensor and directly below the radiation barrier, with a top surface of the radiation shield adjacent to the bottom surface of the protective layer.

17. The method of claim 16 further comprising:
   forming a first alignment feature in a bottom surface of the radiation barrier;
   forming a second alignment feature in the top surface of the radiation shield; and
   aligning the protective layer with respect to the radiation shield by engaging the first alignment feature with the second alignment feature.

18. The method of claim 17 further comprising aligning the protective layer with respect to the proximity sensor by engaging the first alignment feature with the second alignment feature.

19. An apparatus for improving smudge resistance and reducing crosstalk in a reflective proximity sensor, the apparatus comprising:
   a protective layer positioned above a proximity sensor having a radiation emitter and a radiation detector directed toward the protective layer, the protective layer having a top surface and a bottom surface adjacent the proximity sensor; and
   first means for blocking radiation placed in a groove in the bottom surface of the protective layer directly above the means for blocking radiation positioned between the emitter and the detector of the proximity sensor.

20. The apparatus of claim 19 further comprising means for preventing the passage of visible radiation and permitting the passage of infrared radiation applied to the bottom surface of the protective layer.

21. The apparatus of claim 20 further comprising the means for preventing the passage of visible radiation and permitting the passage of infrared radiation applied to the groove between the protective layer and the first means for blocking radiation.

22. The apparatus of claim 19 further comprising second means for blocking radiation positioned between the emitter and the detector of the proximity sensor, directly below the first means for blocking radiation, and adjacent to the bottom surface of the protective layer.

23. The apparatus of claim 22 further comprising means for aligning the protective layer with respect to the means for blocking radiation positioned between the emitter and the detector of the proximity sensor.

24. The apparatus of claim 19 further comprising means for aligning the protective layer with respect to the proximity sensor.

* * * * *